United States Patent [19]

Fye

[11] Patent Number: 5,736,233
[45] Date of Patent: Apr. 7, 1998

[54] METHOD OF PRODUCING MULTICOLOR BACKLIT DISPLAY GRAPHICS, AND PRODUCT THEREOF

[75] Inventor: Michael Edwin Fye, Kokomo, Ind.

[73] Assignee: Delco Electronics Corporation, Kokomo, Ind.

[21] Appl. No.: 761,957

[22] Filed: Dec. 9, 1996

[51] Int. Cl.$^6$ .............. B05D 1/36; B05D 3/02; B05D 5/06; B32B 3/00

[52] U.S. Cl. .............. 428/204; 428/206; 428/207; 427/256; 427/261; 427/275; 101/491

[58] Field of Search .............. 427/256, 275, 427/289, 384, 261; 101/487, 491, 115, 129; 362/30; 428/195, 203, 913.3, 204, 206, 207

[56] References Cited

U.S. PATENT DOCUMENTS

| | | | |
|---|---|---|---|
| 4,248,746 | 2/1981 | Greirer | 260/23 AR |
| 4,845,595 | 7/1989 | Fujii et al. | 363/30 |
| 4,980,221 | 12/1990 | Kobayashi et al. | 428/195 |
| 5,071,824 | 12/1991 | Ohara et al. | 503/227 |
| 5,095,409 | 3/1992 | DeMatteo et al. | 362/23 |
| 5,270,507 | 12/1993 | Nakamura et al. | 200/511 |
| 5,364,688 | 11/1994 | Mahn et al. | 428/187 |
| 5,432,684 | 7/1995 | Fye et al. | 362/30 |

FOREIGN PATENT DOCUMENTS 1309755  3/1973  United Kingdom ............ 362/30

*Primary Examiner*—Michael Lusignan
*Assistant Examiner*—Fred J. Parker
*Attorney, Agent, or Firm*—Jimmy L. Funke

[57] ABSTRACT

A method for producing components such as knobs, switches, and other controls having multiple color display graphics is disclosed. The invention is particularly applicable to the production of graphics that are backlit for night time viewing. In one embodiment, a substrate is initially formed from a light-colored translucent polymeric material. A relatively dark-colored coating is provided on a surface of the translucent substrate, followed by removal of a portion of the coating from the substrate by laser etching to produce on a surface of the component a graphic comprising the material of the substrate. A translucent dye is transferred to the surface of the component by a sublimation dying process. The dye is visible on the graphic, but is either not present or not visible on the remaining surface portion of the component. In another embodiment, a substrate having a light-colored, translucent graphic is made by a multiple material molding method, followed by coloration of the graphic with a translucent dye by the sublimation dying process.

10 Claims, 3 Drawing Sheets

Figure 3a
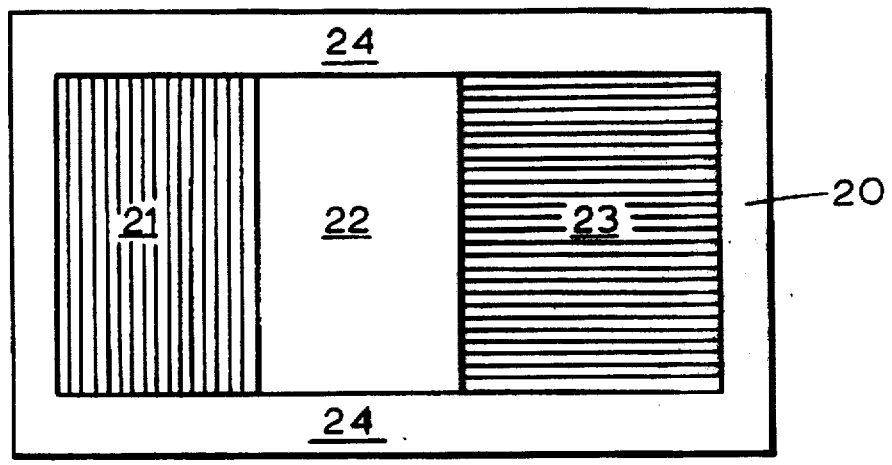
Figure 3b
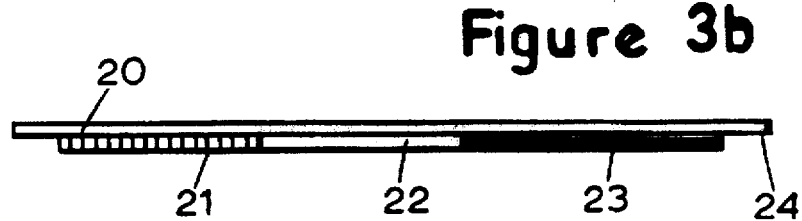
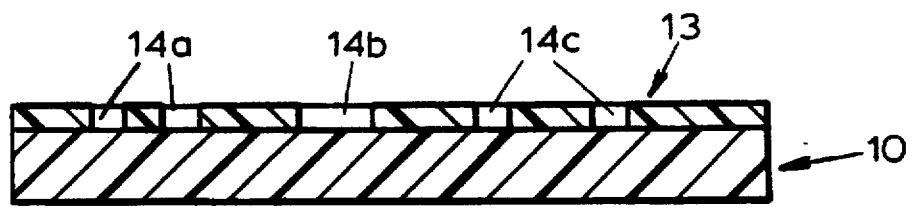
Figure 3c
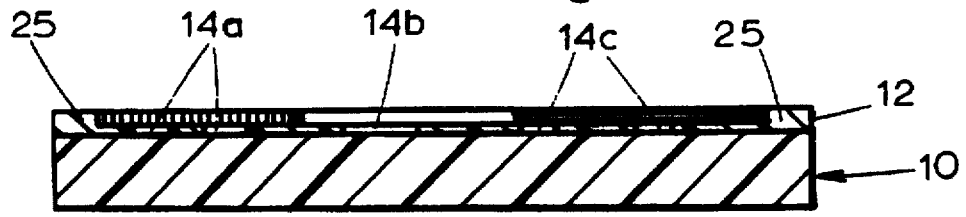
Figure 3d

METHOD OF PRODUCING MULTICOLOR BACKLIT DISPLAY GRAPHICS, AND PRODUCT THEREOF

BACKGROUND OF THE INVENTION

Many products, such as automotive instrument panels, home appliances, medical equipment, consumer electronics, computers, and household switches, can be controlled or monitored by a user via components in the form, for example, of buttons, switches, trim plates, panels, and knobs. These components frequently require graphics that provide information such as alpha-numeric insignia or symbolic insignia to the user. The terms "graphics" and "display graphics" refer to any of these visible insignia, which generally occur in contrast to a background having a color differing from the color of the graphic itself.

There is often a need to produce display graphics that have the ability to be backlit with a light source so that the graphic can be seen in the dark, for example, at night. For example, illuminated switches and buttons for automotive interior applications, such as controls for radios and heating/ air conditioning controls, often have backlit graphics that identify the particular function regulated by the switch or button. Such backlit components have a hidden light source that is positioned behind the graphic in order to allow the graphic to be visible at night. Thus, the graphic must be able to transmit light from the light source. However, backlit components must also be visible during daylight by reflecting light present within the passenger compartment.

If the contrast of the graphic from its background occurs both in light and dark conditions, the graphic is a conventional backlit graphic. If the graphic contrasts with the background (is visible) only when backlit, the graphic is referred to as an "indicator" or a "deadfront graphic." For example, warning light graphics in automobile instrument panels are deadfront graphics. Backlit displays are disclosed, for example, in U.S. Pat. Nos. 5,432,684 and 5,095,409.

Methods of manufacturing display graphics typically include the use of one of three principal procedures or techniques: (1) the printed applique technique; (2) the multiple material molding technique; and (3) the paint-and-laser or paint-and-lase technique. The printed applique technique is one of the easiest and most commonly used techniques for producing graphics having multiple colors. In the printed applique technique, the graphic color(s) and background color(s) are printed directly on the backside of a transparent component by a screen printing operation. Screen printing is capable of precisely positioning various ink colors to construct graphics having multiple colors. However, screen printed articles are often considered unacceptable due to unsatisfactory appearance and performance characteristics. For example, the wear characteristics produced by prior printed applique techniques are often unacceptable, since the printing on the produced component is often easily worn away by repeated friction occurring during use. Further, the overall appearance of components made by printed applique techniques can differ significantly the appearance of components made by other techniques. Therefore, for aesthetic reasons it is often not desirable to use a component produced by a printed applique technique on a final product (for example an automotive instrument panel) that has another component produced by a different technique, such as paint-and-laser or multi-material techniques.

Multiple material molding (sometimes referred to as "multi-material molding") techniques produce components having graphics through the use of highly specialized molding machines having multiple injection barrels. In multiple material molding, one injection barrel (sometimes referred to as a screw assembly) is required for each material that is utilized. These barrels inject colored material into a mold, wherein the colored materials are directly formed into a component having a graphic and a background. Multiple material molding techniques require substantial investment in tooling costs, particularly since an injection barrel is required for each color that is to be utilized. The simplest arrangement for a component having a graphic requires the use of materials of two colors: a light color for the graphic and a dark background. Such an arrangement requires two injection barrels, one barrel for each color. In order to produce a component having a graphic of three colors (for example a red, blue, and white graphic) with a black background, a four-barrel machine would be required (one barrel for each of four colors). For many applications, the requirement of multiple barrels results in prohibitively high tooling costs. In addition to cost considerations, the color appearance of multiple-color graphics produced by prior multi-material molding methods is often unsatisfactory.

"Paint-and-laser" techniques involve producing a transparent plastic substrate that is painted white or another light color to form a white translucent layer over the transparent substrate. The component produced thereby is then painted a relatively dark color, such as black, to form an opaque covering over the white translucent layer. The black covering is then lased away to expose a portion of the white translucent material. The exposed portion of translucent material forms the graphic. Paint-and-laser techniques are described, for example, in U.S. Pat. No. 5,432,684 to Fye et al. assigned to the same assignee as the present application. The entire disclosure of this patent is hereby incorporated herein by reference. Paint-and-laser technology includes hybrid techniques, which can include coloration of the graphic by hot stamp foils or heat transfer dyes prior to overpainting and lasing steps. Another hybrid technique includes the detailed pad printing of small patterned areas, followed by overpainting with a dark color and lasing to form the graphic.

Paint-and-laser techniques typically excel in the production of components having a single color graphic (for example, a white graphic and a black background), since the technique includes the complete sequential painting of the component with one color followed by another color. However, if the graphic requires multiple colors, expensive and time-consuming paint masking operations must generally be incorporated into the technique. For example, known multiple color lasing processes can require printing blocks of colors, each in a separate step, over the substrate prior to overpainting with the dark background color. If red, white, and blue graphics are desired, the process may require the steps of fixing the component (preparing, stabilizing, and/or securing the component so that the component can be painted), painting the component white, curing the white paint, fixing the component for a second time, painting a portion of the component red, curing the red paint, fixing the component for a third time, painting a portion of the component black, curing the black paint, fixing the component for a fourth time, then followed by lasing.

Further, known paint-and-laser multicolor techniques have significant cost and/or quality limitations. The hot stamp foil and heat transfer techniques mentioned above have historically resulted in high numbers of unusable ("high scrap") products and often suffer from lifted edges and objectionable witness lines, wherein the thickness of the transfer applied underneath the dark paint is noticeable.

Witness lines are readily apparent topographies that are not hidden by layers of paint. In a foil or heat transfer operation, the thickness of the heat transfer or printed block of ink underneath dark background color will often be visible in the final product. The pad printed color technique mentioned above also suffers from witness lines due to the required thickness of the ink. Witness lines can in some cases be masked somewhat by using carefully chosen patterns and multiple printings. However, pad printing, for example, generally suffers from the inability to have different colors close to each other and an expensive product due to the number and complexity of processing steps and the typically high scrap rates.

A process known as "sublimation printing" has also been used to produce multiple color graphics in certain products. In this technique, specially formulated solid inks disposed on a carrier are brought into contact with an area that is to be colored. Through the application of pressure and heat, the dye or colorant in the ink is driven into the substrate. Under certain process conditions, the dyes change state from a solid to a gas (i.e., sublime), thereby facilitating penetration into the substrate. The dye gases typically penetrate the surface of the substrate about 0.001 inches to about 0.005 inches (about 0.0254 mm to about 0.127 mm). The sublimation process has been used to put dark graphics on opaque, light-colored computer keyboard key caps, although these key caps are not backlit. Sublimation printing has also been used to place colored designs on white or light-colored plastics and synthetic fabrics. Sublimation dyes are available from a variety of suppliers as either screen printing inks or as inks pre-printed on a carrier in custom designs. Sublimation processes are disclosed in U.S. Pat. Nos. 5,270,507; 5,071,824; and 5,980,221, the entire disclosures of which are hereby incorporated herein by reference.

Accordingly, there is need for a method of producing display graphics, and more particularly multiple-color backlit display graphics, on various substrates that overcomes the above-described shortcomings of the known art, including the ability to provide multiple colors to a backlit graphic in a single step.

SUMMARY OF THE INVENTION

A method for producing articles having display graphics is disclosed. The invention is particularly applicable to the production of buttons, trim plates, and knobs requiring multiple-color display graphics, including deadfront display graphics. The invention can be used on any graphic, backlit or not, for automotive, commercial, and consumer applications, for example.

In one embodiment, the invention provides a method of producing an article having a background area and a colored graphic which includes first providing a substrate having, on an outer surface thereof, (i) a graphic material defining at least part of the graphic and (ii) a second material defining a surround or background area. At least one ink is provided on the outer surface of the article, and the ink is subjected to an elevated temperature to cause at least a portion of the ink to color the graphic. In this embodiment of the invention, the substrate is preferably made by a multiple-material molding technique.

In one aspect of the above-described method, the second material is (i) substantially darkly pigmented and/or (ii) incompatible with the dye, such that the ink appears on the graphic and the ink does not appear on said surround or background area.

In another embodiment, the invention provides a method of producing an article having a background area and a colored graphic which includes first providing a substrate formed from a first material. At least one outer surface of the substrate is provided with a coating material, a portion of which coating is selectively removed from the substrate such that (i) the removed coating material defines at least part of the graphic and (ii) the non-removed portion of the coating material defines at least part of the background area. An ink is provided on at least a portion of the graphic and at least a portion of the background area, and the ink is subjected to an elevated temperature to cause at least a portion of the ink to color the graphic. In this embodiment of the invention, the substrate is preferably made by a paint and lase technique.

In one aspect of the above-described method, the coating material is (i) substantially darkly pigmented and/or (ii) incompatible with the dye, such that the ink appears on the graphic and the ink does not appear on said surround or background area.

In a preferred feature of the embodiments described above, two or more inks of multiple colors are provided on the surface of the article or substrate having a graphic and a surrounding area. Differing portions of the graphic are provided with differing colors to provide a multiple-color graphic. In this manner, each letter of a graphic having multiple letters can have a different color.

Accordingly, the invention preferably provides a method of producing an article having a durable display graphic that can be colored, including the use of multiple colors, without requiring paint masking operations or multiple coloring steps. Because the materials are preferably selected as indicated above, if a portion of an ink is transferred to the background area, the dye is not visible due to dark pigmentation of the background area. The invention also provides a method of producing a backlit display graphic having multiple colors in a single coloring step.

The invention itself, together with further objects and attendant advantages, will best be understood by reference to the following detailed description, taken in conjunction with the accompanying drawings.

BRIEF DESCRIPTION OF THE DRAWINGS

FIG. 3(a) is top plan view of a carrier and ink assembly suitable for use with a method of the invention.

FIG. 3(b) is a cross section view of the carrier and ink assembly of FIG. 3(a).

FIG. 3(c) is a cross section view of the button article of FIG. 2.

FIG. 3(d) is a cross sectional view of the button article of FIG. 3(c) which has been colored in accordance with the invention.

DETAILED DESCRIPTION OF THE DRAWINGS

The invention provides an improved method of manufacturing an article or component having a colored or pigmented graphic display. The invention can be used to produce many types of colored graphics, for use in automotive, commercial, and consumer applications, for example. The invention can produce backlit components, including those utilizing deadfront display graphics, wherein a light source facilitates viewing of the component and graphic under dark conditions, e.g., at night. The invention is particularly suitable for manufacturing buttons, trim plates and knobs requiring multiple-color display graphics for use in automotive and electronics applications.

The invention includes either a paint-and-laser technique or a multi-material molded technique as a step thereof, as described below in detail.

Paint-and-Laser Technique

Referring initially to FIGS. 1–4, a first embodiment of the invention is a method of producing a button component (referred to generally as element 10) by a method that includes a paint-and-laser technique as a step thereof. Generally, this embodiment of the invention includes providing a coating on a surface of a substrate; selectively removing a portion of the coating from the component to produce a graphic comprising the material of the substrate; and transferring a dye into the surface of the component on which the graphic Appears by a "sublimation process." The dye is visible on the graphic, but is either not present or invisible on the remaining portion of the component.

Figure 1:
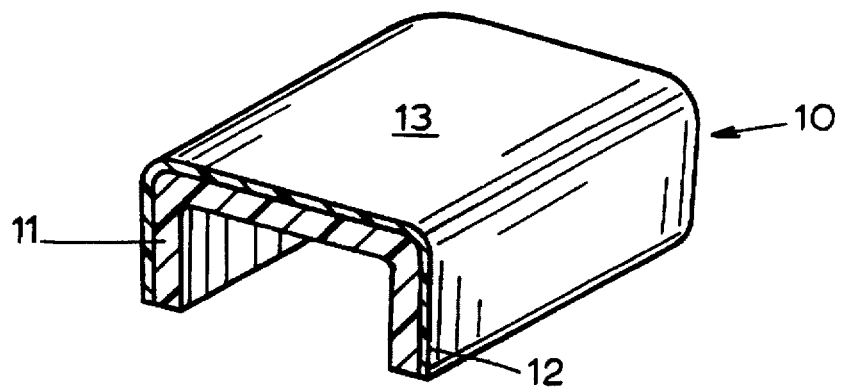
FIG. 1 is a cross section view of a button article formed by a molding process in accordance with one step of a method of the invention.

In FIG. 1, the component 10 includes a base layer or substrate 11 that is preferably formed or molded from a polymeric material by methods known to those of skill in the art. The substrate material should have the ability to: (1) satisfactorily accept a sublimation dye (in a process described below); (2) tolerate the elevated temperatures and/or pressures required for sublimation dye transfer without undergoing substantial deformation such as melting; and (3) transmit enough light (i.e., be sufficiently translucent) that the substrate 11 can be backlit for night time illumination. The significance of these properties will become more apparent from the discussion below.

With respect to the first property list above, the substrate material's ability to satisfactorily "accept" a sublimation dye refers to the substrate material being at least substantially compatible with the dye in order to cause at least substantially permanent coloration of the substrate material. The extent of coloration or adherence of the dye must be suitable for the particular final end use of the component. Similarly, with respect to the second property listed above, materials that are able to tolerate processing temperatures without undergoing substantial deformation include materials that undergo minor alterations upon exposure to elevated temperature and pressure. It is understood that some materials may undergo some minor changes upon being exposed to elevated temperature and/or pressure and still be suitable for use with the invention. Finally, with regard to the third property outlined above, where the component 10 is to be backlit, those of skill in the art will also understand, of course, that the substrate material need not be completely translucent or transparent. It is sufficient if the material is able to allow sufficient light to pass therethrough to allow for satisfactory visibility under dark conditions, depending upon the intended conditions of use. Thus, those of skill in the art will understand that these properties are not absolute and there may be some variation in the above properties among suitable substrate materials. The substrate materials for use with the invention should at least substantially satisfy the above properties or criteria.

Examples of substrate materials meeting these requirements include natural, filled, or white (e.g., not black or very dark) polyesters, polycarbonates, polyester-polycarbonate blends or alloys. Particularly suitable materials have been found to be polyester resins sold under the trade name Valox® (preferably Valox® FV620) by General Electric Company of Pittsfield, Mass.. Preferred polycarbonates are sold under the trade name Lexan® by RTP, Inc. of Winona, Minn. (model designations S-20983, S-20984, S-20985, S-20986, and S-20987). Preferred polyester-polycarbonate blends are sold under the trade name Xenoy® by General Electric Company. Other materials are contemplated within the scope of the invention, for example white acrylonitrile-butadiene-styrene ("ABS") or other suitable non-opaque (translucent) thermoplastic or thermoset material that can be pigmented white or another light color.

For the purposes of the invention, the material utilized for the substrate 11 is preferably substantially translucent, having a light transmission ranging from about 2 to about 50 percent (more preferably about 5 to about 25 percent) and a graphics whiteness of about 30 to about 80 percent (more preferably about 40 to about 60 percent) at a nominal thickness of about 0.8 to about 1.5 millimeters. Such materials can be referred to as low chroma, high lightness value materials.

White polyesters and polyester/polycarbonate blends are naturally translucent and have a color close to white. These materials can be made "whiter" (more opaque) by the addition of various pigments such as titanium dioxide ($TiO_2$). The addition of such pigments is generally not necessary. Some useful materials such as urethanes, polyamides such as nylons, and polycarbonates may require addition of pigment to obtain white translucency desirable with the invention. In addition, many useful fillers known in the art can be used, including calcium carbonate, various silicates, and various clays.

It is understood that although the substrate 11 in FIG. 1 is made of a single material in a single molding operation, the substrate could alternatively include two or more layers of differing materials. In such an arrangement, the exterior layer of the substrate should have each of the properties outlined above (i.e., compatibility with a sublimation dye, ability to tolerate temperatures and pressures required in sublimation dye transfer, and ability to transmit light). In addition, the entire multilayer or composite substrate should be sufficiently translucent to allow for the passage of light therethrough under dark conditions to provide night time visibility.

Following the formation of the molded substrate 11, the substrate 11 is provided with a coating 12, as shown in FIG. 1. The coating 12, which is preferably a polymeric substance (generally referred to as a paint), has properties that satisfy various criteria that will be discussed momentarily. The coating operation can be performed by any suitable method known to those of skill in the art, such as spraying, printing, brushing, or dipping. The coating step can be automated by performing the coating on a conveyor that moves the parts through a coating zone at a rate of about 10 to about 12 feet per minute, for example. In such an operation, the coating zone is an enclosed coating or painting area having a paint spray head attached to an overhead arm. The paint spray head is pointed toward the path of each component 10 on the conveyor at a distance of about 12 to about 18 inches (about 30 to about 46 centimeters) from the component 10. The paint is delivered at a rate of about 1 fluid ounce (about 30 milliliters) per minute with fluid pressures in the range of about 20 to about 50 pounds per square inch and air pressures in the range of about 20 to about 50 pounds per square inch. After the coating 12 has been disposed on the component 10 for a period of about 10 minutes, the component is preferably heated to about 150° F. to about 170° F. (about 65.5° C. to about 76.7° C.) for about 20 to about 30 minutes in order to ensure complete curing and/or drying of the coating 12.

Once the substrate 11 has been provided with the coating 12, the component 10, having an upper surface 13, will have an arrangement depicted in FIG. 1. (Although it may be possible to produce a coated or two-layer substrate in a single molding step, it is preferred to produce the substrate 11 and coating 12 in separate steps, as indicated above.) The coating 12 preferably has a thickness in the range of about 0.01 to about 0.04 millimeters, and more preferably in the range of about 0.02 to about 0.03 millimeters.

The coating 12 should be made from a material having several properties. First, as with the material of which the substrate 11 is made, the coating 12 must be able to sufficiently tolerate elevated processing temperatures and/or pressures of a subsequent sublimation process (described below), without being damaged or deformed. Second, the coating 12 must be one or both of the following: (a) generally opaque and/or darkly pigmented, so that translucent dyes transferred during a subsequent sublimation coloration step are not visible on the coating 12 or (b) sufficiently incompatible with the sublimation dye so that the coating material 12 does not readily accept or become pigmented by the dye. Third, the coating 12 should be of a relatively dark color, i.e. sufficiently pigmented, so as to provide a visible contrast both during daylight with the relatively light-colored graphic and during dark conditions when the graphic is backlit. Finally, the coating 12 should be capable of being selectively removed from the substrate 11 (e.g., by ablating or evaporation with focused laser energy). The coating 12 must, of course, be compatible with and adherable to the substrate 11. The material utilized for the coating 12 is preferably substantially opaque, having a light transmission in the range of about 0.001 to about 1.0 percent (more preferably about 0.01 to about 0.1 percent).

Examples of coating materials that are sufficiently opaque and pigmented that the addition of a transparent dye will not be visually apparent include highly pigmented dark polycarbonate, polyurethane, and polyester based coatings. Examples of coating materials that will not accept the transparent dye include nylons, silicones, polyphenylene oxide ("PPO"), and polytetrafluoroethylene ("PTFE") based coatings. A preferred material for the coating 12 is sold under the trade designation LE343 paint by Red Spot Paint and Varnish of Evansville, Ind.. However, other suitable materials are readily available.

Figure 2:
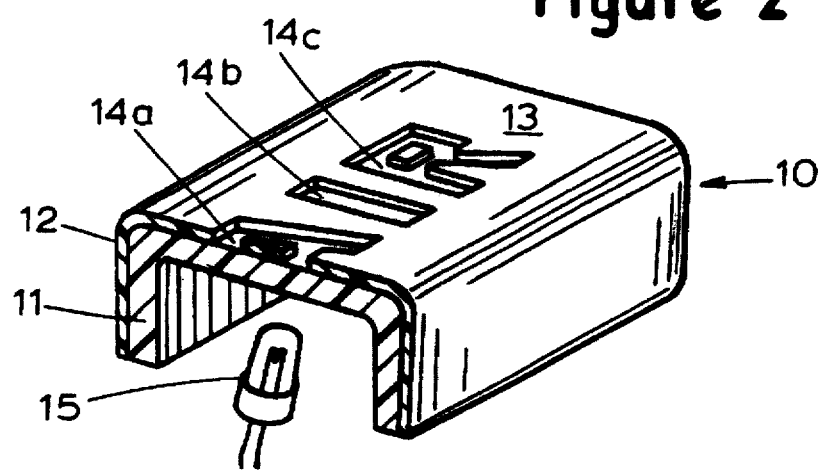
FIG. 2 is a cross section view of the button article of FIG. 1, formed by a paint-and-laser technique in accordance with the invention.

Referring now to FIG. 2, after the substrate 10 has been provided with the coating 12, intended graphic areas 14a, 14b, and 14c (referred to collectively as a graphic 14) are created by selectively removing the coating 12 from the substrate 11. This coating removal step can be performed by techniques and with apparatus known to those of skill in the art, such as forced erosion, melting, evaporation, or vaporization. The preferred technique is a laser etching or ablating process. A laser etching process is facilitated by the ability of the dark material of the coating 12 to absorb infrared ("IR") light emitted by a laser apparatus. Lasing is preferably performed with an apparatus available under the trade name Elite Laser System from Control Laser Corporation of Orlando, Fla.. The aforementioned laser apparatus is a 100 watt NdYaG (Neodynium Yttrium Garnet) laser operating at a wavelength of about 1064 nanometers (near infrared wavelengths).

In the laser etching step, a focused laser beam is steered across the surface 13 of the component 10 so as to selectively remove a portion of the coating 12 to form the graphic 14 "AIR" shown in FIG. 2. The laser energy is absorbed by the coating 12, which causes the evaporation or ablating of coating 12 from the substrate 11. After this operation, the graphic 14 has the relatively light color of the substrate 11 and is translucent.

The surface 13 of the coated substrate 11 need not be entirely flat. In one embodiment of the invention, the graphic 14 can be raised from the plane of the surface 13. In this embodiment, the substrate is molded with an integral raised graphic portion, and the coating 12 is provided on the component in the same manner as described above. The coating 12 on the raised graphic portion of the surface 13 is subsequently lased in the manner described above.

For illustrative purposes, a single light source 15 is shown in FIG. 2. The light source 15 can be housed within a carrier or light pipe (not shown) for the purpose of promoting the distribution of light from the light source 15 to the graphic 14. There are many different possible variations in the type and arrangement of the light source 15 and component 10 that will be within the knowledge of those skilled in the art upon reading the present disclosure.

In a next step, the upper surface 13 of the component 10 is treated in a sublimation coloring process, to provide at least one translucent color on the graphic 14 that appears in contrast to the relatively dark, surrounding color of the coating 12. Generally, this process includes applying a dye-impregnated ink to a sublimation transfer sheet or carrier, followed by drying to form a film adhered to the carrier. This film is then contacted with the top surface of the component while the carrier is subjected to a heat treatment process so that the sublimation dye penetrates below the top surface of the component.

More specifically, referring to FIGS. 3(a) and 3(b), a carrier 20 is provided with inks 21, 22, and 23 of three different colors, red, white, and blue, respectively. An area 24 does not have an ink disposed thereon. The carrier 20 is preferably made of paper or other suitable material. Paper suitable for use as the carrier 20 is available from Avery Dennison of Framingham, Mass. as Inkjet Paper No. 26-300. The carrier 20 and inks 21–23 are dried so that the inks are adhered to the carrier 20 in the form of a film. An electrostatic printer can be used to provide the inks 21–23 to the carrier 20.

The component 10, shown in FIG. 3(c), is fixtured (for example, nested in an apparatus in a predetermined manner). Known hot stamping apparatus having the ability to nest the component 10 can be utilized in this step. The ink portions 21–23 on the carrier 20 are brought into intimate contact with the surface 13 of the component 10 (comprising the coating 12 and the graphic 14) to form a carrier/ink/component sandwich. The inks 21–23 can be contacted with the entire surface 13 of the component 10, or a portion of the surface 13. Where the inks 21–23 are contacted with only a portion of the surface 13, the location of ink portions 21–23 can be loosely tailored to the shape of the graphic 14. As shown in FIGS. 3(a) and 3(b), the area 24 does not have an ink disposed thereon. Although a single ink can be used to provide color to the entire graphic 14, in preferred embodiments the invention utilizes multiple inks to produce a graphic 14 having multiple colors. In the embodiment of FIGS. 1–4, each of the portions 14a, 14b, and 14c has a different color.

The sandwich is then subjected to heat and/or pressure sufficient to transfer the ink 21–23 into the surface 13. The heat treatment is preferably conducted at an elevated temperature of about 100° C. or greater, more preferably in the range of about 125° C. to about 230° C., and most preferably in the range of about 150° C. to about 200° C., for example about 176° C. The applied pressure is preferably in the range of about 30 to about 90 lbs. per square inch (psig), and more preferably about 60 psig. The total treatment time is preferably in the range of about 10 seconds to about 10 minutes, and more preferably about 15 seconds to about 45 seconds. The hot stamping press mentioned above can be used to provide the heat and pressure to the component 10 and the carrier 20. Although the term "sublimation" is used to describe this process, those of skill in the art will understand that in some instances the ink may vaporize or melt, as opposed to sublime, prior to migrating into the surface 13 of the component 10. The sublimation dye can include a mixture of dyes that have relatively high melting points and high vapor pressures, preferably at temperatures just below the melting or softening temperatures of the chosen substrate 11. Upon heating, such dyes will melt, sublime, or vaporize, thereby facilitating migration of the dyes.

The sublimation inks 21–23 preferably penetrate the surface 13 of the component 10, and the graphic areas 14a, 14b, 14c are thereby colored by the inks 21, 22, and 23, respectively, in contact therewith, as shown in FIG. 3(d). Preferably, the inks 21–23 penetrate about 0.001 inches to about 0.005 inches (about 0.0254 mm to about 0.127 mm) into the surface 13 of the component 10. The dark surrounding areas of the surface 13 having the coating 12 appear unchanged (even in areas 25 in contact with the ink), since the coating 12 (a) does not accept the dye from the inks 21–23 or (b) does accept the dye, but is sufficiently opaque and pigmented that the addition of the transparent dye is not visually apparent. In the embodiment of FIG. 3(d), the coating 12 accepts the dyes from the inks 21–23 (shown exaggeratedly in the Figure), but the dyes are not visible due to the pigmentation and opacity of the coating 12.

The dye preferably has a light transmission in the range of about 10 to about 60 percent. Since, as described above, the material for the substrate 11 has a preferred light transmission of about 2 to about 50 percent (more preferably about 5 to about 25 percent), the total light transmission through the pigmented substrate is in the range of about 0.2 to about 30 percent. However, the light transmission is highly dependent upon the color provided to the substrate 11. As the extent of pigmentation increases, more light is absorbed by the pigments.

The dye-impregnated ink for use in this process generally includes about 1 wt. % to about 30 wt. % of a sublimation dye, about 3 wt. % to about 50 wt. % of a vehicle resin, and about 50 wt. % to about 90 wt. % of a solvent for dissolving the vehicle resin.

Dyes suitable for use in the "sublimation process" include those adapted to carry out sublimation, vaporization, melting, or migration due to diffusion when they are subjected to elevated temperatures. Suitable sublimation dyes include nitro dyes, azo dyes, quinophthalone dyes, anthroquinone dyes, and rhodamine dyes, for example. Preferred dyes are readily available organic dyes such as azo, anthroquinone, and rhodamine, for example. Such dyes are available commercially as liquids in consistencies formulated for screen, lithographic, inkjet, offset, and electrostatic printing applications. Suitable dyes are also available commercially from some suppliers pre-printed on carrier paper. Liquid or pre-printed colorants are available from Technical Subdye Inks, Inc. of Port Jefferson, N.Y.. Dyes in liquid form are available from Union Ink Co. of Ridgefield, N.J.. Various sublimation dyes are disclosed in the aforementioned U.S. Pat. No. 5,270,507, previously incorporated herein by reference.

Generally, the dye-impregnated ink is prepared by dissolving a selected dye in a binder solution. The binder solution may be prepared from a vehicle resin and a solvent for dissolving the vehicle resin. Vehicle resins should have little or no affinity for the dyes and should not prevent the sublimation, vaporization, melting, or migration of the dye. Suitable vehicle resins include, for example, polyorganosiloxanes, vinylsilicone resin, vinylsilicone oil, cellulose resins, alkyd resins, water-soluble acrylic resins, polyvinyl alcohols, polyamide resins, silicone resins, and mixtures thereof. This list is exemplary in nature, and other vehicle resins suitable for use with the invention are known to those of skill in the art.

Solvents suitable for use in the binder solution include benzotriazole, ethyl alcohol, isopropyl alcohol, toluene, xylene, ethyl acetate, ethyl cellosolve, butyl cellosolve, water, and mixtures thereof. Other suitable solvents include ethers such as 2-methoxyethanol, 2-ethoxyethanol, 2-butoxyethanol, 2-(hexyloxy)ethanol, 2-phenoxyethanol and 2-(benzyloxy)ethanol; alcohols having two functionalities; aromatic hydrocarbons such as benzene, toluene (ortho-, meta-, para-)xylene, ethylbenzene, isopropylbenzene, and mesitylene; ketones such as acetone, methylethylketone, methylethylketone, and diethylketone; acetic acid esters such as methyl acetate, ethyl acetate, propyl acetate, isopropyl acetate, butyl acetate, isobutyl acetate, sec-butyl acetate, pentyl acetate, and isopentyl acetate; methyl formate, ethyl formate, propyl formate, butyl formate, isobutyl formate, and pentyl formate; propionic acid esters such as methyl propionate, ethyl propionate, butyl propionate, and isopentyl propionate; butyric acid esters such a methyl butyrate, ethyl butyrate, and butyl butyrate, alcohols such as methanol, ethanol, 1-propanol, 2-propanol, 1-butanol, 2-butanol, isobutylalcohol, tert-butylalcohol, 1-pentanol, 2-pentanol, 3-pentanol, 2-methyl-1-butanol, isopentylalcohol, tert-pentylalcohol, 3-methyl-2-butanol, neopentylalcohol and 1-hexanol; and ethers such as diethylether, dipropylether, and anisole. Although the term "solvent" is used herein, those of skill in the art will understand that a portion of the dye and/or vehicle resin can be dispersed, as opposed to solubilized, in the solvent.

The particular vehicle resins and solvent which make up the binder solution will depend upon the particular dye that is selected and conditions under which the coloration process is conducted.

Figure 4:
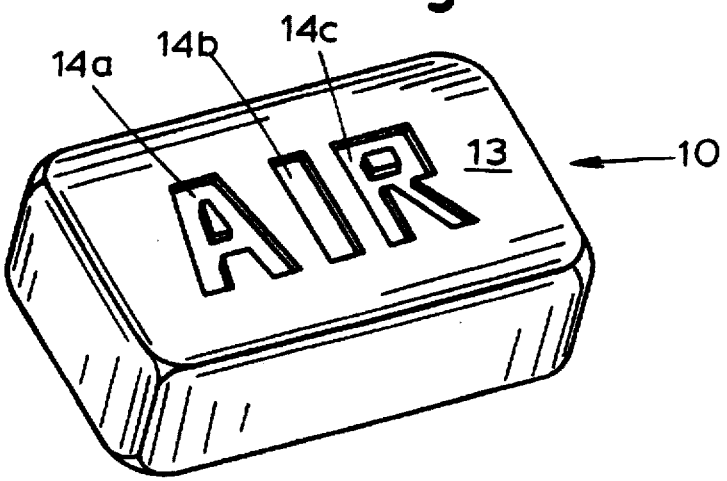
FIG. 4 is a perspective view of the article shown in FIG. 2 and which has been colored in accordance with one step of a method of the invention.

FIG. 4 illustrates the final product of the above method. The component 10 has a graphic 14 with the letters "AIR" in colors red 14a, white 14b, and blue 14c, respectively. Since the material of the substrate 11 is relatively light or colorless, the transparent dyes are visible on the graphic 14. The graphic 14 will appear colored both when viewed in a reflective mode (e.g., during daylight) and when backlit (e.g., at night). The transparent nature of the substrate maximizes the transmission of light through the backlit component during night time viewing, while the white translucent layer contributes to visibility during light conditions by increasing the amount of light that is reflected.

Thus, the invention is able to selectively color areas of graphic content. The above-described embodiments of the invention simplify the paint-and-laser operation by requiring only a single step of applying color after application of an etchable coating. The graphic is highly durable, as the pigmentation from the sublimation dye penetrates into the surface of the graphic. Prior methods required stepwise application of multiple colors, with curing and fixturing steps between each color application step. The invention can provide higher quality graphic components with reduced costs and reduced manufacturing times.

Multi-Material Molded Technique

Another embodiment of the invention will be described below with reference to FIGS. 5 and 6. In this embodiment, the graphic and surrounding area are molded by a multiple material molding technique so as to create two contrasting colors, such as a white graphic and a black surrounding area. The molded component is subjected to a sublimation coloring step similar to that describe above.

Figure 5:
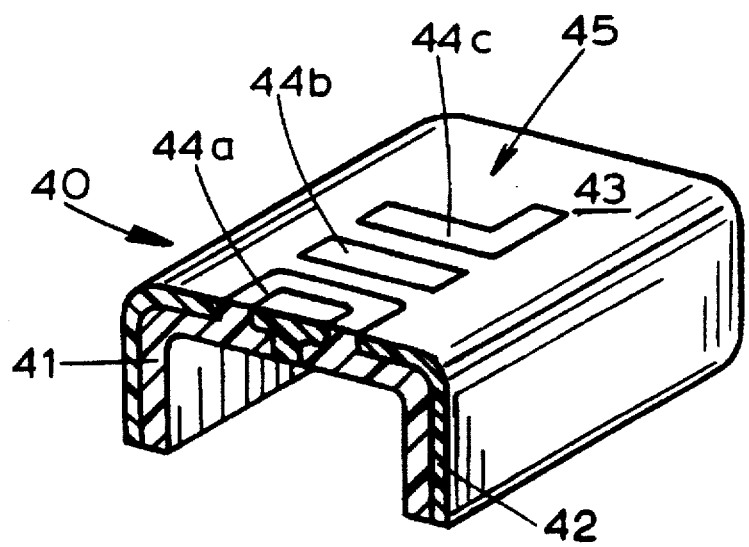
FIG. 5 is a cross section view of a button article in accordance with the invention, formed by a multiple-material molded technique.

Referring to FIG. 5, a multiple material molding technique forms a component 40 having a relatively light portion 41 and a relatively dark portion 42. Conventional molding apparatus known to those of skill in the can be used to form the component 40. Since only two materials 41 and 42 are required, an apparatus having only two barrels for delivery and forming of the material can be used. The relatively light portion 41 is contiguous with graphic areas 44a, 44b, and 44c (forming the word "OIL" on a surface 45 of the component 40 in the embodiment illustrated in FIGS. 5 and 6, referred to herein generally as element 44). The relatively dark portion 42 is contiguous with an area 43 surrounding the graphic 44. The area 43 is referred to as a "surround."

The graphic areas 44a, 44b, and 44c are molded from a polymeric material (e.g., a "plastic") that satisfies the same criteria described above with regard to the substrate 11 of the embodiment of FIGS. 1–4. Namely, the graphic 44 has the ability to (1) satisfactorily accept a sublimation dye; (2) tolerate elevated processing temperatures and/or pressures required for transfer of a sublimation dye without undergoing substantial deformation, such as melting; and (3) transmit sufficient light so that the produced component can be backlit for night time viewing. As described above, those of skill in the art will understand that these properties are not absolute and there may be some variation in the properties among suitable materials. The material for the graphic 44 for use with this embodiment of the invention should at least substantially satisfy the above properties or criteria.

There are many types of materials suitable for use as the portion 41, including natural, filled, or light-colored polyesters, polycarbonates, polyester-polycarbonate blends or alloys, and acrylic resins. As with the substrate 11 of the embodiment of FIGS. 1–4, an example of a preferred white polyester for use with the invention is sold under the trade name Valox® FV620 by General Electric Company. An example of a commercially available polyester/polycarbonate blend is sold under the trade name Xenoy® by General Electric Company. Preferred polycarbonates are sold under the trade name Lexan® by RTP, Inc. (model designations S-20983, S-20984, S-20985, S-20986, and S-20987). Many useful fillers known in the art can be used, including calcium carbonate, various silicates, and various clays.

The portion 42, including the area 43 around the graphic, is molded from a polymeric material that satisfies the same criteria as the coating 12 in the embodiment of FIGS. 1–4, namely, the material 42: (1) can tolerate the elevated processing temperatures of a subsequent sublimation process without melting or other deformation; (2) is either (a) opaque and sufficiently darkly pigmented so that the transparent dyes transferred during graphics coloration are not noticeable on the material 42 and/or (b) does not readily accept the sublimated dyes; and (3) is sufficiently pigmented to create a contrast with the graphic area both during light conditions and dark conditions where there is backlighting. Again, the material for the portion 42 of this embodiment of the invention should at least substantially satisfy the above properties or criteria.

Examples of material for portion 42 that is pigmented sufficiently so that the transparent dye is not noticeable on the surround 43 include highly pigmented dark polycarbonates and polyesters. Examples of coating materials that will not accept the transparent dye include nylons, silicones, polyphenylene oxide ("PPO"), and polytetrafluoroethylene ("PTFE") based coatings. A preferred material for the portion 42 is a liquid injection moldable silicone available from General Electric Company under the trade designation "GE Silicone Rubber LIM Grade." However, other suitable materials are readily available.

After molding the graphic 44 and surrounding area 43, the surfaces of the graphic area can be treated so as to create one of a variety of translucent colors appearing in contrast to the dark surround. This step utilizes the sublimation process described above with regard to FIGS. 1–4. See particularly FIGS. 3(a)–(c). This process can be generally described by stating that the article 40 is initially fixtured so as to allow a carrier printed with appropriate sublimation inks to come in intimate contact with the surface 45 (including portions 43 and 44). The carrier/ink/component sandwich is then subjected to heat and pressure sufficient to transfer the dyes into the surface of the component 40.

Figure 6:
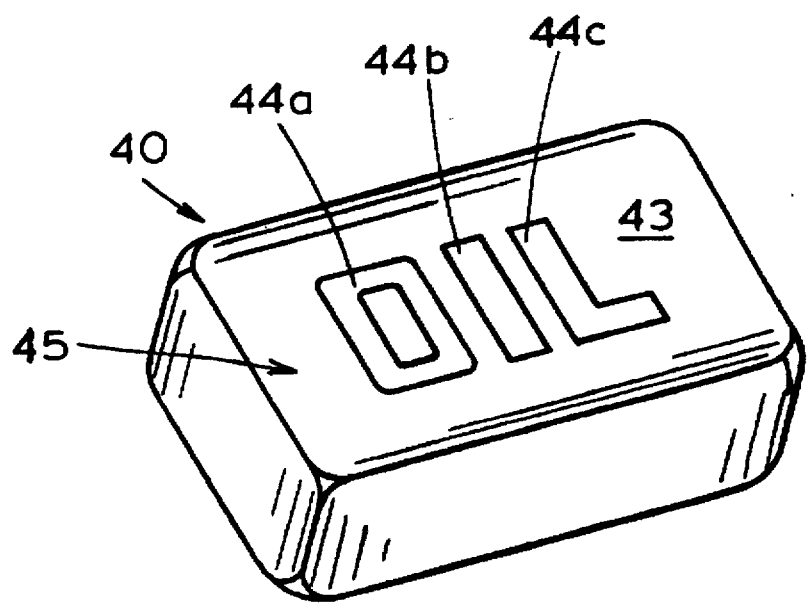
FIG. 6 is a perspective view of the article shown in FIG. 5 and which has been colored in accordance with a method of the invention.

As shown in FIG. 6, by this process, the areas 44a, 44b, and 44c of the graphic 44 are colored by the ink in contact therewith. The relatively dark surround 43 appears unchanged, because the materials have the selected properties described above. The surround 43 (a) does not accept the transparent dye or (b) accepts the dyes but is sufficiently opaque and pigmented that the dye is not visually apparent.

The above-described method of the invention is also able to selectively color the graphic areas 14a, 14b, 14c in a single step without affecting the color of the surround 43. As a result, the invention allows for the production of multiple-color graphic components with multi-material molding techniques with molding apparatus requiring only two barrels for the delivery and forming of molding material. Thus, a graphic comprising the word "TEMPERATURE" could have each letter colored differently in a single process step, as opposed to prior methods that would require costly equipment and/or multiple coloration steps.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

I claim:

1. A method of producing an article having a background and a graphic adjacent said background, comprising the steps of:
    (a) forming a substrate having an outer surface comprising (i) a region of light transmitting graphic material defining at least part of said graphic and (ii) an adjacent region of background material being substantially opaque defining said background, said background material being selected from a group consisting of (1) material pigmented substantially darker than a first color dye ink which is light transmitting, and (2) materials incompatible with said first color dye ink;
    (b) applying said first color dye ink on a first area of said outer surface including at least a portion of said graphic material and at least a portion of said background material; and
    (c) subjecting said ink to a temperature greater than about 100° C. to cause said first color dye ink to penetrate at least said graphic material, so that said ink colors said graphic but does not visually appear to color said background.

2. The method of claim 1, wherein:

said background material is compatible with the ink such that a portion of the ink penetrates into said background material, but said background material has a sufficiently dark color that said ink is substantially not visually apparent on said background material.

3. The method of claim 1, wherein:

said background material is substantially incompatible with the ink such that the ink does not adhere to said background material.

4. The method of claim 1, wherein:

said graphic material is substantially translucent and has a first color; and said background material has a second color darker than said first color.

5. The method of claim 1, wherein:

said graphic material has a light transmission value in a range of about 5 percent to about 25 percent.

6. The method of claim 5, wherein:

said graphic material comprises a material selected from the group consisting of polyesters, polycarbonates, polyester-polycarbonate blends, urethanes, and nylons.

7. The method of claim 1, wherein:

said background material has a light transmission value in a range of about 0.01 percent to about 0.1 percent.

8. The method of claim 7, wherein:

said background material comprises a material selected from the group consisting of polycarbonates, polyurethanes, polyesters, nylons, silicones, polyphenylene oxide, and polytetrafluoroethylene.

9. The method of claim 1, including the steps of:

applying a second color dye ink which is light transmitting on a second area of said outer surface including at least a portion of said graphic material and at least a portion of said background material; and subjecting said second ink to a temperature greater than about 100° C. to cause said second ink to penetrate at least said graphic material, such that said second ink colors said graphic but does not visually appear to color said background.

10. An article made by the method recited in claim 1.

* * * * *